(12) United States Patent
Shoyama

(10) Patent No.: US 6,302,175 B1
(45) Date of Patent: Oct. 16, 2001

(54) PNEUMATIC TIRES WITH CABLE BEAD CORE

(75) Inventor: Yoshinobu Shoyama, Tokyo (JP)

(73) Assignee: Bridgestone Corporation, Tokyo (JP)

(*) Notice: Subject to any disclaimer, the term of this patent is extended or adjusted under 35 U.S.C. 154(b) by 0 days.

(21) Appl. No.: 09/519,886

(22) Filed: Mar. 6, 2000

(30) Foreign Application Priority Data

Mar. 5, 1999 (JP) ................................. 11-058029

(51) Int. Cl.[7] .............................. B60C 15/04; D07B 1/10
(52) U.S. Cl. ............................................. 152/540; 245/1.5
(58) Field of Search .................................. 152/539, 540; 245/1.5

(56) References Cited

U.S. PATENT DOCUMENTS 4,887,655 * 12/1989 Imai et al. ................. 152/540 X
5,676,777 * 10/1997 Watanabe ..................... 152/540

FOREIGN PATENT DOCUMENTS 53-51804   5/1978 (JP) .

* cited by examiner

*Primary Examiner*—Adrienne C. Johnstone
(74) *Attorney, Agent, or Firm*—Sughrue, Mion, Zinn, Macpeak & Seas, PLLC

(57) ABSTRACT

A pneumatic tire comprises a bead core formed by laminating three or more sheath layers of spirally twisted sheath filaments around a thick core wire and making reverse the twisting direction of the sheath filament in these sheath layers every the sheath layer, in which the number of twisting pitches in the sheath filament of a second sheath layer viewed from the outermost side is made smaller than that in sheath filament of a sheath layer located inward from the second sheath layer.

4 Claims, 3 Drawing Sheets

PNEUMATIC TIRES WITH CABLE BEAD CORE

BACKGROUND OF THE INVENTION

1. Field of the Invention

This invention relates to a pneumatic tire comprising a bead core formed by laminating three or more sheath layers on a core wire.

2. Description of Related Art

In pneumatic tires used under conditions of a high speed and a heavy load such as a pneumatic tire for an aircraft and the like, a large stress is usually applied to a bead portion during the running, so that a bead core durable to such a large stress must be embedded in the bead portion.

As the bead core durable to such a large stress, there has been known, for example, a bead core as disclosed in JP-A-53-51804, that is, a bead core 1 called as a cable bead formed by laminating plural sheath layers 4, each of which layers being constituted by substantially spirally twisting a plurality of fine sheath filaments 3, on a single thick core wire 2 as shown in FIG. 5.

In the conventional bead core 1, the twisting direction of the sheath filament 3 in the sheath layers 4 becomes reverse every the sheath layer. For example, when the sheath filament 3 in a certain sheath layer 4 among the sheath layers 4 is Z-lay, the sheath filaments in both sheath layers adjacent thereto (inside and outside sheath layers) are S-lay. When the twisting direction of the sheath filament 3 is reverse every the sheath layer as mentioned above, the torsional rigidity of the bead core 1 can be increased, whereby the change of deformation bearing ratio in each tire portion can be decreased in correspondence with the change of slip angle to improve steering stability and high-speed straight running performance.

However, when the pneumatic tire provided with the conventional bead core 1 is used over a long period of time, there is caused a problem that the fatigue fracture is often created in the sheath filament 3 of a second sheath layer 4 viewed from the outermost side to degrade the durability of the bead portion.

This is due to the fact as mentioned below. That is, when the pneumatic tire is run under a heavy load, the bead core 1 is repeatedly subjected to torsion in left-handed and right-handed rotations under an action of a large external force. In this case, if the torsion in the right-handed rotation (clockwise rotation) is applied to the bead core 1, a sheath layer 4Z in which a twisting direction of a sheath filament 3 is Z-lay is deformed into a direction of opening the sheath filaments 3Z (or a direction of increasing the size of the sheath layer 4Z), while a sheath layer 4S in which a twisting direction of a sheath filament 3 is S-lay is deformed into a direction of closing the sheath filaments 3S (or a direction of decreasing the size of the sheath layer 4S). On the other hand, if the torsion in the left-handed rotation (anticlockwise rotation) is applied to the bead core 1, the sheath layer 4Z of Z-lay is deformed into the direction of closing the sheath filaments 3Z (or the size-decreasing direction), while the sheath layer 4S of S-lay is deformed into the direction of opening the sheath filaments 3Z (or the size-increasing direction).

As a result, if sheath filaments in a certain sheath layer are Z-lay and sheath filaments in both sheath layers adjacent to the Z-lay sheath layer are S-lay as mentioned above, when the torsion in the right-handed rotation is applied to the bead core, the sheath filaments 3Z in the Z-lay sheath layer 4Z deforming into the size-increasing direction directly contact with the sheath filaments 3S of the outer S-lay sheath layer 4S deforming into the size-decreasing direction to rub them with each other and also the sheath filaments 3Z are pushed down by the outer sheath filaments 3S to locally dent at the contacting position inward in the radial direction. On the other hand, when the torsion in the left-handed rotation is applied to the bead core, the sheath filaments 3Z in the Z-lay sheath layer 4Z deforming into the size-decreasing direction directly contact with the sheath filaments 3S of the inner S-lay sheath layer 4S deforming into the size-increasing direction to rub them with each other and also the sheath filaments 3S are pushed down by the outer sheath filaments 3Z to locally dent at the contacting position inward in the radial direction.

The rubbing force and the dent deformation amount as mentioned above become larger at more outer sheath layer among the sheath layers. However, the sheath filaments in the outermost sheath layer are not rubbed or dented by pushing in the deformation into the size-increasing direction. Therefore, it is frequent that the fatigue fracture is firstly created in the sheath filaments of a second sheath layer viewed from the outermost side of all sheath layers by the rubbing and dent deformation as mentioned above.

SUMMARY OF THE INVENTION

It is, therefore, an object of the invention to provide a pneumatic tire capable of improving the durability of the bead portion by effectively controlling the fatigue fracture in the sheath filaments of a second sheath layer viewed from the outermost side of all sheath layers.

According to the invention, there is the provision of in a pneumatic tire comprising a bead portion provided with a bead core formed by laminating three or more sheath layers, each of which layers being constituted by substantially spirally twisting a plurality of fine sheath filaments, on a single thick core wire and making reverse twisting directions of the sheath filaments in the sheath layers every the sheath layer, an improvement wherein the number of twisting pitches in a sheath filament of a second sheath layer viewed from an outermost side of the sheath layers is made smaller than that in a sheath filament of a sheath layer located inward from the second sheath layer.

When the number of twisting pitches in the sheath filament of the second sheath layer is made smaller than that in the sheath filament of the sheath layer located inward from the second sheath layer as mentioned above, the pitch of the sheath filament in the second sheath layer is made long and the inclination angle of the sheath filament with respect to the circumferential direction of the tire is made small, whereby the cross angle with respect to the sheath filament in the adjoining sheath layer, i.e. outermost sheath layer or a third sheath layer viewed from the outermost side becomes small (more acute angle).

As a result, the contacting length in the contact between the second sheath layer and the sheath layer adjacent thereto becomes long to lower the rubbing stress, whereby the fatigue fracture of the sheath filament in the second sheath layer is effectively controlled. And also, as the pitch of the sheath filament in the second sheath layer becomes long as mentioned above, the radius of curvature in the sheath filament itself becomes large, so that when the sheath filament is pushed and locally dented by the sheath filament in the outer sheath layer, curvature in the dented portion is made small (gentle), whereby the fatigue fracture through repetitive bending deformation of the sheath filament is effectively controlled.

Further, the maximum rubbing force is applied to the sheath filaments in the outermost sheath layer as mentioned above, so that there is a case that the fatigue fracture may be first caused in the sheath filament of the outermost sheath layer. In this case, however, the fatigue fracture in the sheath filament of the outermost sheath layer can effectively be controlled by making the number of twisting pitches in the sheath filament of the outermost sheath layer smaller than that in the sheath filament of the second sheath layer.

Moreover, when the number of the sheath layers is four or more, if the number of twisting pitches in the sheath filament is gradually or stepwise decreased from the innermost sheath layer toward the outermost sheath layer, the fatigue fracture of the sheath filament in a third sheath layer viewed from the outermost side can effectively be controlled.

BRIEF DESCRIPTION OF THE DRAWINGS

The invention will be described with reference to the accompanying drawings, wherein.

DESCRIPTION OF THE PREFERRED EMBODIMENTS

Figure 1:
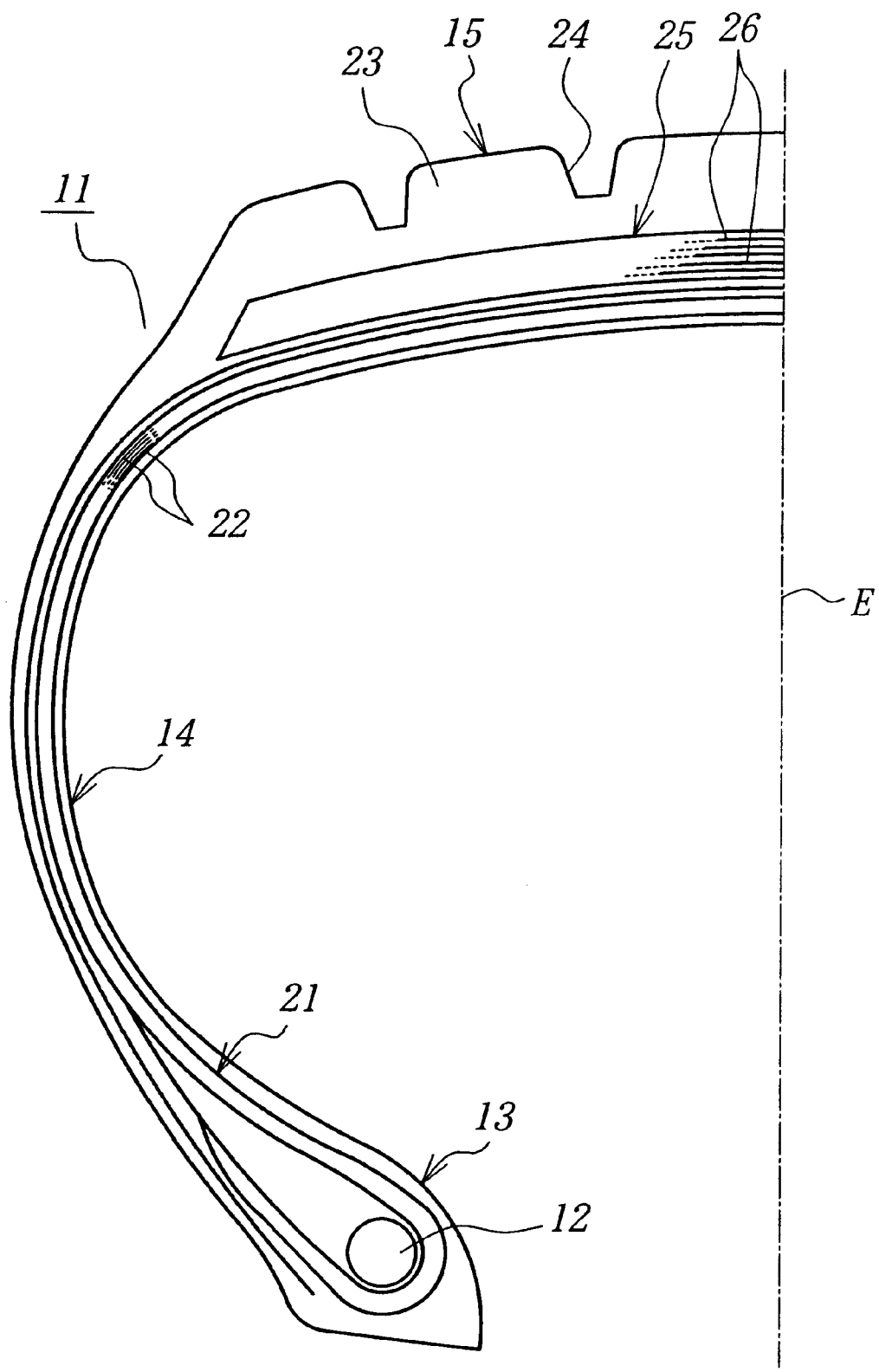
FIG. 1 is a diagrammatically radial half section view of an embodiment of the pneumatic tire according to the invention.

In FIG. 1 is shown a pneumatic radial tire 11 to be mounted onto an aircraft. The tire 11 comprises a pair of bead portions 13 each embedding a bead core 12 of a circle at its section, a sidewall portion 14 extending outward from the bead portion 13 in a radial direction of the tire and a tread portion 15 connecting the radially outer ends of the sidewall portions 14 to each other and having substantially a cylindrical shape.

And also, the tire 11 is reinforced by a carcass 21 toroidally extending from one bead portion 13 to the other bead portion 13. The carcass 21 is comprised of plural carcass plies 22 piled one upon the other. Most of plies 22 are turn-up plies, each widthwise end portion of each of which plies being turned up around the bead core 12 from an inside of the tire toward an outside thereof, and the remaining carcass ply(s) located as an outer carcass ply is a down ply(s) extending along the outside of the turnup portion of the above carcass ply to the bead core 12. In each of the carcass plies 22 are embedded a plurality of cords such as textile cord or the like extending substantially in a direction perpendicular to an equatorial plane E of the tire (or in the radial direction of the tire).

A tread rubber 23 is arranged outside the carcass 21 in the radial direction and is provided on its outer surface with a plurality of main grooves 24 and many lateral grooves (not shown) crossed with the main grooves 24. A belt 25 is arranged between the carcass 21 and the tread rubber 23 and comprised of plural belt layers 26 piled one upon the other. In each of these belt layers 26 are embedded a plurality of cords such as textile cord or the like arranged at a given inclination angle with respect to the equatorial plane E of the tire, or a cord spirally wound so as to extend substantially in parallel to the equatorial plane E.

Figure 2:
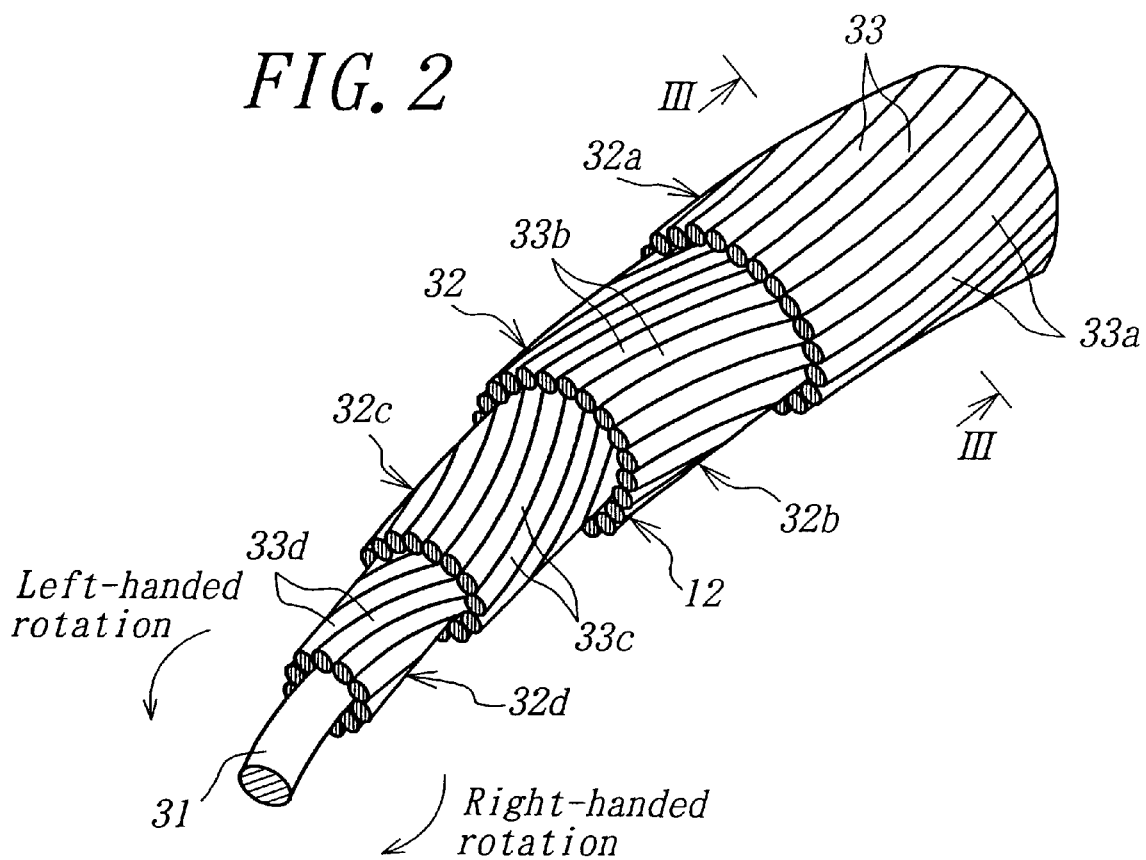
FIG. 2 is a partial perspective view of a bead core used in the tire of FIG. 1.
Figure 3:
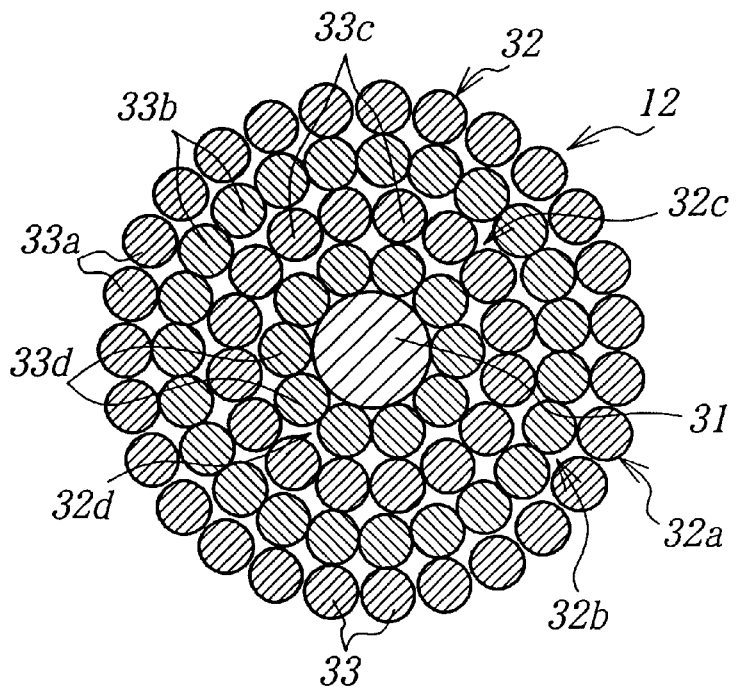
FIG. 3 is a section view taken along a line III—III of FIG. 2.
Figure 4:
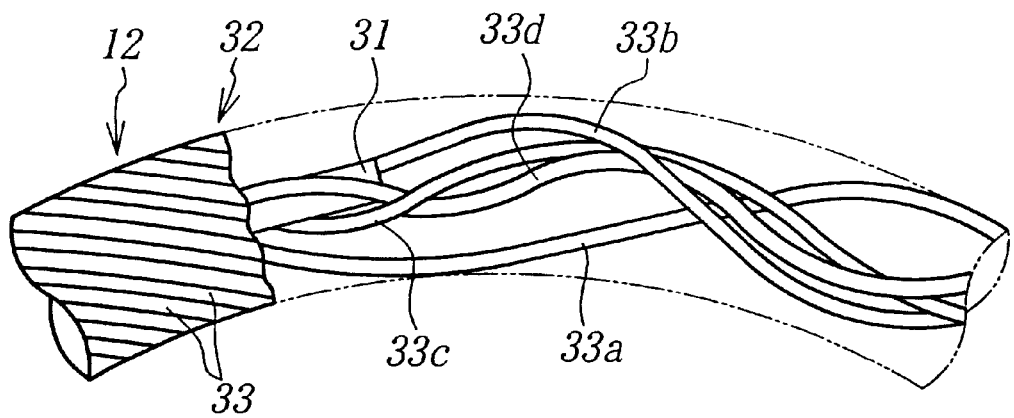
FIG. 4 is a partially cutaway view illustrating a twisting state of a sheath filament in each sheath layer.
Figure 5:
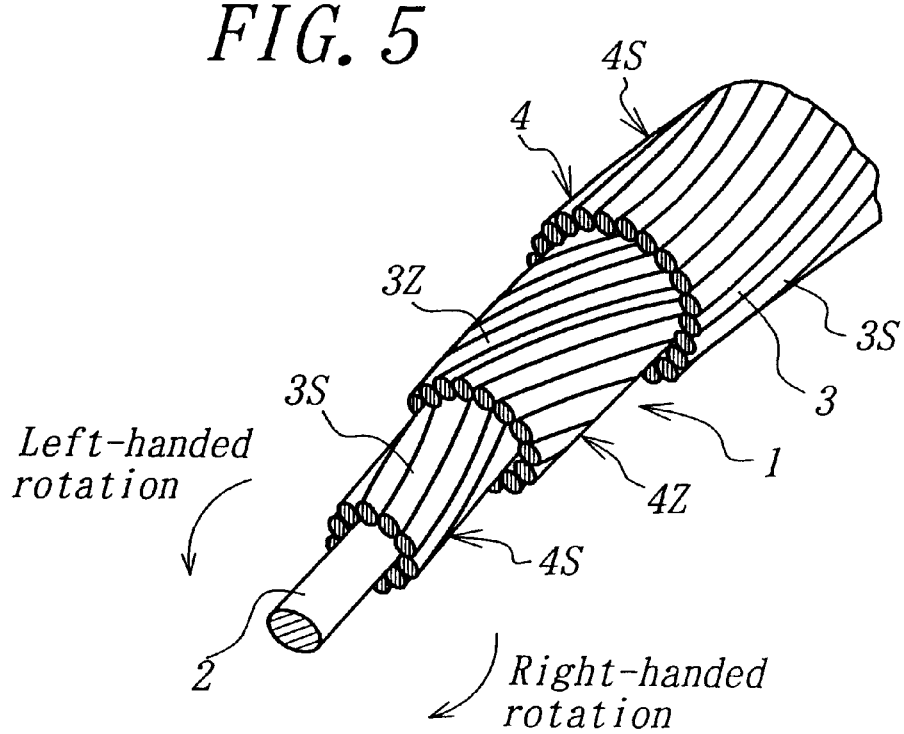
FIG. 5 is a partial perspective view of the conventional bead core.

As shown in FIGS. 2–4, each of the bead cores 12 comprises a single ring-shaped thick core wire 31 made of a naked steel wire filament (not covered with rubber). Numeral 32 is each of three or more sheath layers laminated on the core wire 31, four sheath layers in the illustrated embodiment. The sheath layer 32 is constituted by spirally twisting a plurality of sheath filaments 33 having a diameter finer than that of the core wire 31 many times in a close-packed state around the core wire 31. The sheath filament 33 in these sheath layers 32 is made of the same naked steel wire filament as the core wire 31.

The twisting direction of the sheath filament 33 constituting each sheath layer 32 becomes reverse every the sheath layer. In the illustrated embodiment, the twisting direction of the sheath filament is S-lay in a sheath filament 33a of an outermost sheath layer 32a, Z-lay in a sheath filament 33b of a second sheath layer 32b viewed from the outermost side, S-lay in a sheath filament 33c of a third sheath layer 32c, and Z-lay in a sheath filament 33d of a fourth sheath layer 32d.

In the illustrated embodiment, the number of twisting pitches in the sheath filament 33b of the second sheath layer 32b (concretely a value of 5) is made smaller than those in the sheath filaments 33c, 33d of the third and fourth sheath layers 32c, 32d located inside the second sheath layer 32b (concretely values of 6, 7). The term "number of twisting pitches" used herein means the twisting number when twisting the sheath filament 33 around the ring-shaped core wire 31 from a certain starting point on the core wire 31 until the sheath filament 33 returns to such a starting point.

When the number of twisting pitches in the sheath filament 33b of the second sheath layer 32b is made smaller than those in the sheath filaments 33c, 33d of the third and fourth sheath layers 32c, 32d located inward from the second sheath layer 32b, the pitch of the sheath filament 33b is made long and the inclination angle of the sheath filament 33b with respect to the circumferential direction of the tire is made small, whereby the cross angle with respect to the sheath filaments 33a, 33c in the adjoining sheath layers 32 (outermost sheath layer 32a and third sheath layer 32c) becomes small (more acute angle).

As a result, the contacting length in the contact between the sheath filament 33b of the second sheath layer 32b and the sheath filament 33a, 33c of the adjoining sheath layer 32 (outermost and third sheath layers 32a, 32c) becomes long to lower the rubbing stress, whereby the fatigue fracture of the sheath filament 33b in the second sheath layer 32b is effectively controlled. And also, as the pitch of the sheath filament 33b in the second sheath layer 32b becomes long as mentioned above, the radius of curvature in the sheath filament 33b itself becomes large, so that when the sheath filament 33b is pushed and locally dented by the sheath filament 33a in the outer sheath layer, curvature in the dented portion is made small (gentle), whereby the fatigue fracture through repetitive bending deformation of the sheath filament 33b is effectively controlled.

Moreover, as the maximum rubbing force is applied to the sheath filaments 33a in the outermost sheath layer 32a as mentioned above, there is a case that the fatigue fracture may be first caused in the sheath filament 33a of the outermost sheath layer 32a. In the illustrated embodiment, therefore, the number of twisting pitches in the sheath filament 33a of the outermost sheath layer 32a (concretely a value of 4) is made smaller than that in the sheath filament 33b of the second sheath layer 32b (concretely a value of 5), whereby the fatigue fracture of the sheath filament 33a is effectively controlled.

And also, the number of twisting pitches in the sheath filament 33 of the sheath layer 32 is gradually decreased from the innermost sheath layer 32d toward the outermost sheath layer 32a in the illustrated embodiment, whereby the fatigue fracture of the sheath filament 33c in the third sheath layer 32c is also effectively controlled. Moreover, the number of twisting pitches in the sheath filament 33 of the sheath layer 32 may be decreased stepwise from the innermost sheath layer 32d toward the outermost sheath layer 32a from the same reason as mentioned above, i.e. the number of twisting pitches may be made small toward the outer sheath layer 32 while the number of twisting pitches in the sheath filament 33 is made equal between some adjoining sheath layers 32.

Although the four sheath layers 32 are applied to the bead core 12 in the illustrated embodiment, three sheath layers may be applied to the bead core in the invention.

The following example is given in illustration of the invention and is not intended as limitation thereof.

There are provided a comparative tire having a bead core comprised of four sheath layers in which the number of twisting pitches in a sheath filament of a sheath layer is 5, 5, 6 and 6 from the innermost sheath layer toward the outermost sheath layer, and a test tire having a bead core comprised of four sheath layers in which the number of twisting pitches in a sheath filament of a sheath layer is 7, 6, 5 and 4 from the innermost sheath layer toward the outermost sheath layer as mentioned above. Each of these tires has a tire size of APR46×17R20/30PR.

Then, each tire is inflated under an air pressure of 17.1 kgf/cm$^2$, mounted onto a rim (45×16−20) of a drum testing machine and repeatedly run at a speed of 64 km/h for only 10 minutes per a hour under a load of 16700 kgf 800 times. A sheath filament in a second sheath layer viewed from the outermost side is cut out in a length of about 30 cm from the tire after the test and a new tire therefor, respectively, and set onto a tensile testing machine to measure a tensile strength at break of the sheath filament. As a result, when the tensile strength at break is represented by an index on the basis that the new tire is 100, the tensile strength at break after the test is 97.5 in the comparative tire and 99.5 in the test tire. That is, the residual strength is improved in the test tire.

As mentioned above, according to the invention, the bead portion durability can be improved by effectively controlling the fatigue fracture of the sheath filament in the second sheath layer viewed from the outermost side of the sheath layers.

What is claimed is:

1. In a pneumatic tire comprising a bead portion provided with a bead core formed by laminating three or more sheath layers, each of which layers being constituted by substantially spirally twisting a plurality of fine sheath filaments, on a single thick core wire and making reverse twisting directions of the sheath filaments in the sheath layers every the sheath layer, an improvement wherein the number of twisting pitches in a sheath filament of a second sheath layer viewed from an outermost side of the sheath layers is made smaller than that in a sheath filament of a sheath layer located inward from the second sheath layer.

2. A pneumatic tire according to claim 1, wherein the number of twisting pitches in the sheath filament of the outermost sheath layer is made smaller than that in the sheath filament of the second sheath layer.

3. A pneumatic tire according to claim 1, wherein the number of twisting pitches in the sheath filament is gradually decreased from the innermost sheath layer toward the outermost sheath layer.

4. A pneumatic tire according to claim 1, wherein the number of twisting pitches in the sheath filament is decreased stepwise from the innermost sheath layer toward the outermost sheath layer.

* * * * *